United States Patent
Broicher et al.

(10) Patent No.: US 11,174,927 B2
(45) Date of Patent: Nov. 16, 2021

(54) ELECTRIC DRIVE ASSEMBLY

(71) Applicant: GKN Automotive Limited, Birmingham (GB)

(72) Inventors: Simon Broicher, Hürth (DE); Mark Schmidt, Königswinter (DE); Ervin Szilagyi, Neunkirchen-Seelscheid (DE); Damian Dudek, Cologne (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/059,552

(22) PCT Filed: Jun. 1, 2018

(86) PCT No.: PCT/EP2018/064450
§ 371 (c)(1),
(2) Date: Nov. 30, 2020

(87) PCT Pub. No.: WO2019/228639
PCT Pub. Date: Dec. 5, 2019

(65) Prior Publication Data
US 2021/0231201 A1    Jul. 29, 2021

(51) Int. Cl.
*B60K 1/00*      (2006.01)
*F16D 13/58*   (2006.01)
(Continued)

(52) U.S. Cl.
CPC ........... *F16H 37/0813* (2013.01); *B60K 1/00* (2013.01); *B60K 17/02* (2013.01); *B60K 17/04* (2013.01);
(Continued)

(58) Field of Classification Search
CPC combination set(s) only.
See application file for complete search history.

(56) References Cited

U.S. PATENT DOCUMENTS 9,278,618 B2      3/2016  Valler et al.
2013/0260941 A1*  10/2013 Nomura ................. F16H 37/08
                                                                 475/150
(Continued)

FOREIGN PATENT DOCUMENTS

DE    102009031869 A1    2/2011
EP       1354744 A2    10/2003
(Continued)

OTHER PUBLICATIONS

International Search Report and Written Opinion for PCT/EP2018/064450 dated Mar. 8, 2019 (13 pages; with English translation).

*Primary Examiner* — David R Morris
*Assistant Examiner* — Lillian T Nguyen
(74) *Attorney, Agent, or Firm* — Bejin Bieneman PLC

(57) ABSTRACT

An electromotive drive assembly comprises a housing arrangement with a first and second housing element between which an intermediate plate is arranged; a drive unit comprising a drive shaft which is rotatably drivable about a first axis of rotation; a transmission arrangement with an intermediate shaft which extends through an opening of the intermediate plate and is rotatably drivable by the drive shaft, and with a power split unit which is drivingly connected to the intermediate shaft and is rotatably supported about a third axis of rotation coaxial with the first axis of rotation by a first bearing in the intermediate plate and a second bearing in the second housing element; and a clutch arrangement by which the power path between the drive unit and the power split unit can be selectively connected and disconnected, wherein the opening comprises a clutch receptacle on which at least one element of the controllable clutch arrangement is axially supported.

15 Claims, 5 Drawing Sheets

(51) Int. Cl.
*F16H 48/00* (2012.01)
*F16H 37/08* (2006.01)
*B60K 17/02* (2006.01)
*B60K 17/04* (2006.01)
*F16D 11/14* (2006.01)
*F16H 57/021* (2012.01)
*F16H 57/037* (2012.01)
*F16H 57/02* (2012.01)

(52) U.S. Cl.
CPC .............. *F16D 11/14* (2013.01); *F16D 13/58* (2013.01); *F16H 57/021* (2013.01); *F16H 57/037* (2013.01); *B60K 2001/001* (2013.01); *F16H 2057/02034* (2013.01); *F16H 2057/02052* (2013.01); *F16H 2702/02* (2013.01)

(56) References Cited

U.S. PATENT DOCUMENTS

| | | | |
|---|---|---|---|
| 2014/0066247 A1* | 3/2014 | Smetana | F16H 1/48 475/149 |
| 2014/0135169 A1 | 5/2014 | Rossey et al. | |
| 2015/0119181 A1 | 4/2015 | Fox | |
| 2016/0138659 A1* | 5/2016 | Strandberg | F16D 3/223 475/150 |
| 2018/0180150 A1* | 6/2018 | Hiyoshi | F16H 48/08 |
| 2019/0360557 A1* | 11/2019 | Haupt | B60K 17/046 |

FOREIGN PATENT DOCUMENTS

| | | | |
|---|---|---|---|
| FR | 2693527 A1 * | 1/1994 | ............ B60K 17/08 |
| WO | 2016066215 A1 | 5/2016 | |
| WO | 2017157479 A1 | 9/2017 | |

* cited by examiner

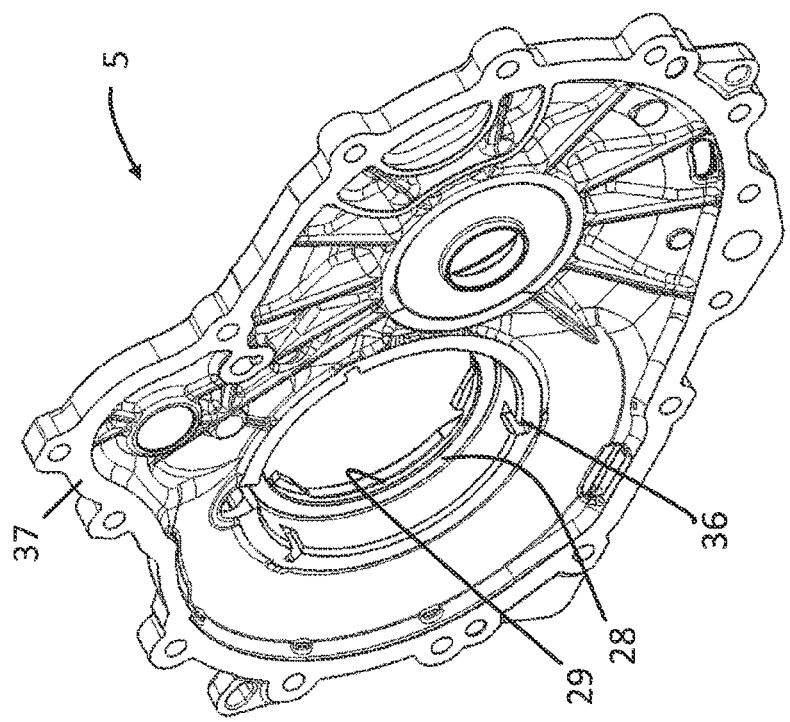

ELECTRIC DRIVE ASSEMBLY

CROSS-REFERENCE TO RELATED APPLICATIONS

This application is a national stage of, and claims priority to, Patent Cooperation Treaty Application No. PCT/EP2018/064450, filed on Jun. 1, 2018, which application is hereby incorporated herein by reference in its entirety.

BACKGROUND

From WO 2016/066215 A1, an electric drive for powering a motor vehicle is known. The electric drive comprises an electric motor and a transmission unit with a step-up gearing and a differential gearing, which are accommodated in a housing arrangement. The transmission gearing comprises a transmission shaft parallel to the motor shaft for driving the differential gearing. The differential gearing is arranged coaxially to the electric motor and comprises a differential housing drivable by the transmission shaft and a differential gear set which divides an introduced torque between two side shafts. The housing arrangement includes an intermediate wall with an opening through which the transmission shaft extends. A clutch is provided in the power path between the differential housing and the differential gear set to establish or interrupt torque transmission as required. The clutch is arranged coaxially to the differential gearing and is actuatable by a controllable actuator which has an electromagnet connected to the intermediate wall.

From WO 2017/157479 A1 an electric drive for driving a motor vehicle's drive axle is known. The electric drive comprises an electric machine, a transmission unit and a double clutch device, which are accommodated in a housing arrangement. The double-clutch device is arranged coaxially to the electric machine and comprises two disk packs that can variably transmit a torque introduced into the clutch cage to two output shafts. The disc packs are each operated by means of an associated actuator. The actuators each comprise an annular piston coaxial with the clutch device, one of which is seated in a cover section and the other in an intermediate wall of the housing so as to be axially displaceable.

From the U.S. Pat. No. 9,278,618 B2, a driveline with an electric drive unit and, drivingly connected thereto, an axle gear unit with a fixed ratio is known.

DESCRIPTION

Disclosed herein is an electric drive assembly for driving a motor vehicle, which enables a selective separation or connection of the power path between a drive unit and a power distribution unit and is space-saving. The electromotive drive assembly can be provided as the sole drive for a motor vehicle. Alternatively, an internal combustion engine can be provided in hybrid drive concepts in addition to the electromotive drive assembly. The electric motor and the combustion engine can then either drive the vehicle alone or together drive the vehicle in a superimposed manner.

An electric drive assembly comprises: a housing arrangement with a first housing element and a second housing element between which an intermediate plate is arranged; a drive unit accommodated in the first housing element, comprising a drive shaft which is rotatably drivable about a first axis of rotation; a transmission arrangement comprising an intermediate shaft extending through an opening in the intermediate plate and rotatably drivable by the drive shaft about a second rotational axis parallel to the first rotational axis, and a power split unit drivingly connected to the intermediate shaft and rotatably supported by a first bearing in a bearing seat of the intermediate plate and a second bearing in the second housing element about a third rotational axis coaxial with the first rotational axis; and a controllable clutch arrangement comprising a clutch device configured to selectively establish or interrupt torque transmission between the drive unit and the power split unit, and an actuating device for actuating the clutch device; wherein the clutch device is arranged coaxially to the intermediate shaft, and wherein the opening of the intermediate plate comprises a clutch receptacle at which at least one element of the clutch arrangement is axially supported.

The drive assembly according to the disclosure has the advantage that it requires the same or only slightly increased axial installation space as a comparable drive assembly that does not have the function of selectively disconnecting the power path between a drive unit of a power split unit. The axial installation space of drive arrangements whose drive shaft and power split unit are arranged coaxially is determined, among other things, by the bearing of the power split unit and the associated bearing seat, which are arranged between the drive shaft and the power split unit. The axial installation space required by the bearing and the bearing seat must inevitably be bridged by a transmission shaft that drivingly connects the drive shaft and the power split unit. In the drive assembly according to the disclosure, this axial installation space is used to accommodate at least parts of the clutch arrangement necessary for selectively disconnecting the power path between a drive unit and the power split unit.

The clutch arrangement comprises the clutch device, briefly also referred to as clutch, and the actuating device. It is provided that at least one element of the clutch arrangement is axially supported against the clutch receptacle of the intermediate plate, wherein the element can also be accommodated in a receiving space of the intermediate plate. The axially supported element can generally be any element of the clutch arrangement, for example a part of the clutch and/or a part of the actuating device for the clutch, which is axially supported directly or indirectly against the intermediate plate. Furthermore, it is possible that the axially supported element is also supported radially against the intermediate plate. According to an embodiment, the clutch is located radially inside the actuating device. For an axial space-saving design, it is advantageous if the clutch at least partially overlaps axially with the actuating device.

A power split unit shall be understood as any arrangement which makes it possible to distribute the power of at least one input element to at least two output shafts and in particular allows a speed compensation between the output shafts. The power split unit can be designed as a differential or a double friction clutch device (sometimes referred to as eTwinster).

Any type of clutch can be used which is suitable, as required, to establish or interrupt a torque transmission in the power path between the drive unit and the power split unit, for example by a positive or frictional connection between two elements within the power path. In a possible embodiment, the controllable clutch can be a dog clutch. In a further embodiment, the controllable clutch can be designed as a friction clutch, in particular as a multi disc clutch. A friction clutch has the advantage that a continuous closing of the clutch is possible, especially in case of speed differences of the clutch elements, and that a shifting characteristic can be applied selectively.

In another embodiment, the intermediate shaft can be drivingly connected to the drive shaft via a first gear stage and to the power split unit via a second gear stage, wherein the clutch being arranged between the intermediate shaft and one of the first gear stage and the second gear stage within the power path between the drive unit and the power split unit. This enables the clutch device to be arranged in a space-saving manner in the axial installation space described above, which is required by the first bearing of the power split unit and the associated bearing seat and is bridged by the intermediate shaft. For this purpose, according to a further embodiment, the clutch device can be arranged completely axially between a center plane of the first gear stage and a center plane of the second gear stage.

The central plane is generally understood to be an imaginary plane which is perpendicular to the first axis of rotation of the drive shaft and divides the axial extension of the associated element into two parts of equal length. For the central planes of the gear stages, in particular the axial extension of the contact area between the elements of the gear stage which are in contact with each other shall be taken into account, for example the width of engagement of two mutually meshing toothings.

If the clutch device is arranged in the power path between the intermediate shaft and one of the first gear stage and the second gear stage, a possible embodiment may provide that the clutch comprises a first clutch element which is connected to the intermediate shaft in a rotationally fixed manner, and a second clutch element which is rotationally fixedly connected to a member of the first or the second gear stage that is rotatably supported on the intermediate shaft, wherein at least one of the first clutch element and the second clutch element being movable in the axial direction. It is also possible that either the first clutch element is designed in one piece with the intermediate shaft or the second clutch element is designed in one piece with an element of the first or the second gear stage rotatably supported on the intermediate shaft.

The clutch device is actuated by means of the controllable actuating device, which can also be called an actuator. The actuator can act on one of the clutch elements so that at least one of the first clutch element and the second clutch element can be moved reversibly in the axial direction into an open position, in which the first clutch element and the second clutch element can rotate freely relative to each other about the second axis of rotation, and into a closed position, in which the first and second clutch elements are connected to each other for torque transmission.

The actuator for actuating the clutch can have any configuration, e.g., in the form of an electromotive, electromagnetic or hydraulic operable actuator. According to an exemplary embodiment, the actuator comprises a drive and a transmission unit for transmitting a force generated by the drive to the clutch. A transmission unit may in particular comprise a support element axially supported against the clutch receptacle and an actuator element axially movable with respect thereto, which is axially supported against one of the first clutch element and the second clutch element. The transmission unit may in particular be designed with a ramp mechanism which is arranged coaxially to the second axis of rotation and which translates a rotational movement generated by the drive into a translational movement. The supporting element and the setting element can be designed in particular in a ring shape, i.e. as a supporting ring and setting ring, respectively. At least one of the supporting element and the setting element can have a supporting face which is variable over the circumference. In this way, a relative rotation of the one element in relation to the other element causes an axial movement of the setting element. In further specification, the elements may each have circumferential ball grooves of variable depth in which balls are received, wherein the setting element and the supporting element are axially supported against each other by the balls. However, generally any actuator is conceivable which can move one of the two clutch elements linearly, for example a spindle drive, a stroke solenoid or a hydraulic control arrangement.

In order to enable a reversible movement of one of the clutch elements, the actuator can be designed such that it can move the clutch element, both, in one direction and in the opposite direction. In an alternative embodiment, one of the first clutch element and the second clutch element can be loaded by a return spring, and can be moved by the actuator against a return force of the return spring. In this way, a less complex actuator can be used, since it only has to move the clutch element in a single-acting manner. However, it is also possible that the actuator is double-acting and a return spring is provided. This can be useful, for example, if the switching period of one of the open position and the closed position is to be kept as short as possible from, or if the clutch is to be transferred to a defined switching position if the actuator fails.

In a possible embodiment, the intermediate plate may have a circumferential flange portion by which the first housing element and the second housing element are connected to each other, wherein a central plane of the flange portion is axially spaced from at least one of a central plane of the bearing seat and a central plane of the clutch receptacle. The axial extension relevant for determining the center planes of the bearing seat and the clutch receptacle is defined in each case by the faces which are in contact with the respective element received by the bearing seat or the clutch receptacle. This results in a convex/concave shape of the intermediate plate in a longitudinal section at least in partial areas, which leads to a stiffening of the intermediate plate. In particular, the deformation of the intermediate plate due to the sometimes considerable bearing forces of the first bearing of the power distribution unit, which is accommodated in a bearing seat of the intermediate plate, can thus be reduced. The axial installation space required by the first bearing and the associated bearing seat and thus the overall axial length of the drive assembly can thus be reduced.

To increase the stiffening of the intermediate plate, the center plane of the bearing seat may be located on the side of the center plane of the flange portion facing the power split unit. Due to this design, the intermediate plate is compression-loaded by the bearing force of the first bearing.

In a further embodiment, the center plane of the bearing seat can be located between the center plane of the flange portion and the center plane of the clutch receptacle, or the center plane of the clutch receptacle can be located between the center plane of the flange portion and the center plane of the bearing seat. Thus, in a longitudinal section, a cranked shape of the intermediate plate is obtained, which makes it possible in a space-saving manner to arrange the intermediate plate around the power split unit, and the clutch arrangement at least partially in axial overlap with the power split unit.

In another embodiment, at least one of the center plane of the bearing seat and the center plane of the flange portion may be arranged with an axial overlap with at least one element of the clutch arrangement.

In another embodiment, a sealing element can be arranged in the opening of the intermediate plate which comprised the clutch receptacle and through which the intermediate shaft is passed. This divides the space formed by the housing arrangement, in which the transmission arrangement is accommodated, into two separate portions, in each of which an oil bath can be provided, wherein the levels and/or oil types of the oil baths can be adapted to the gear stages contained in each of the portions.

BRIEF SUMMARY OF THE DRAWING FIGURES

In the following figures an exemplary embodiment is explained.

FIG. 5 shows the intermediate plate of the drive assembly of FIG. 1 in a second perspective view.

DESCRIPTION

Figure 1:
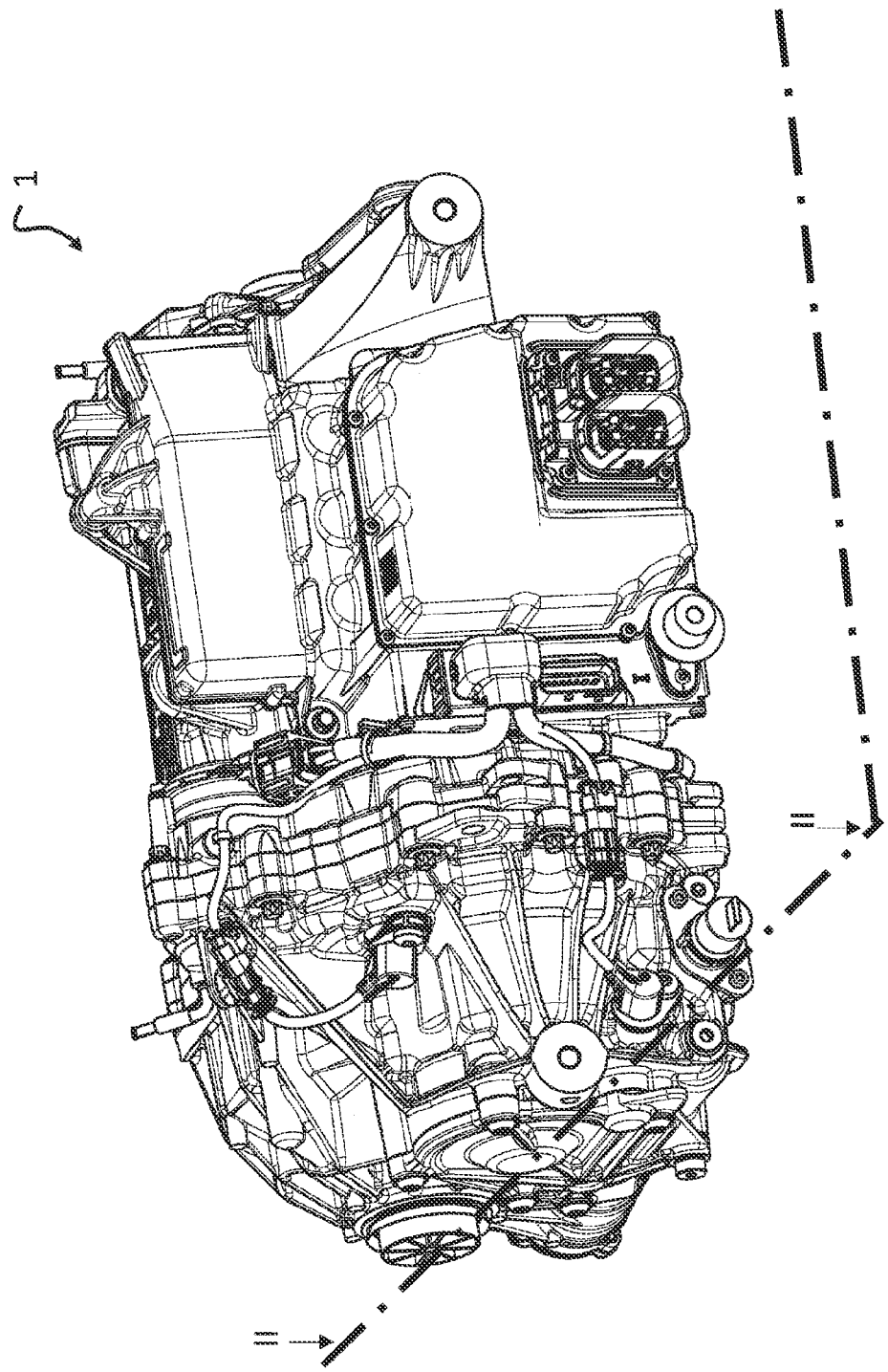
FIG. 1 shows a drive assembly in a perspective view.
Figure 2:
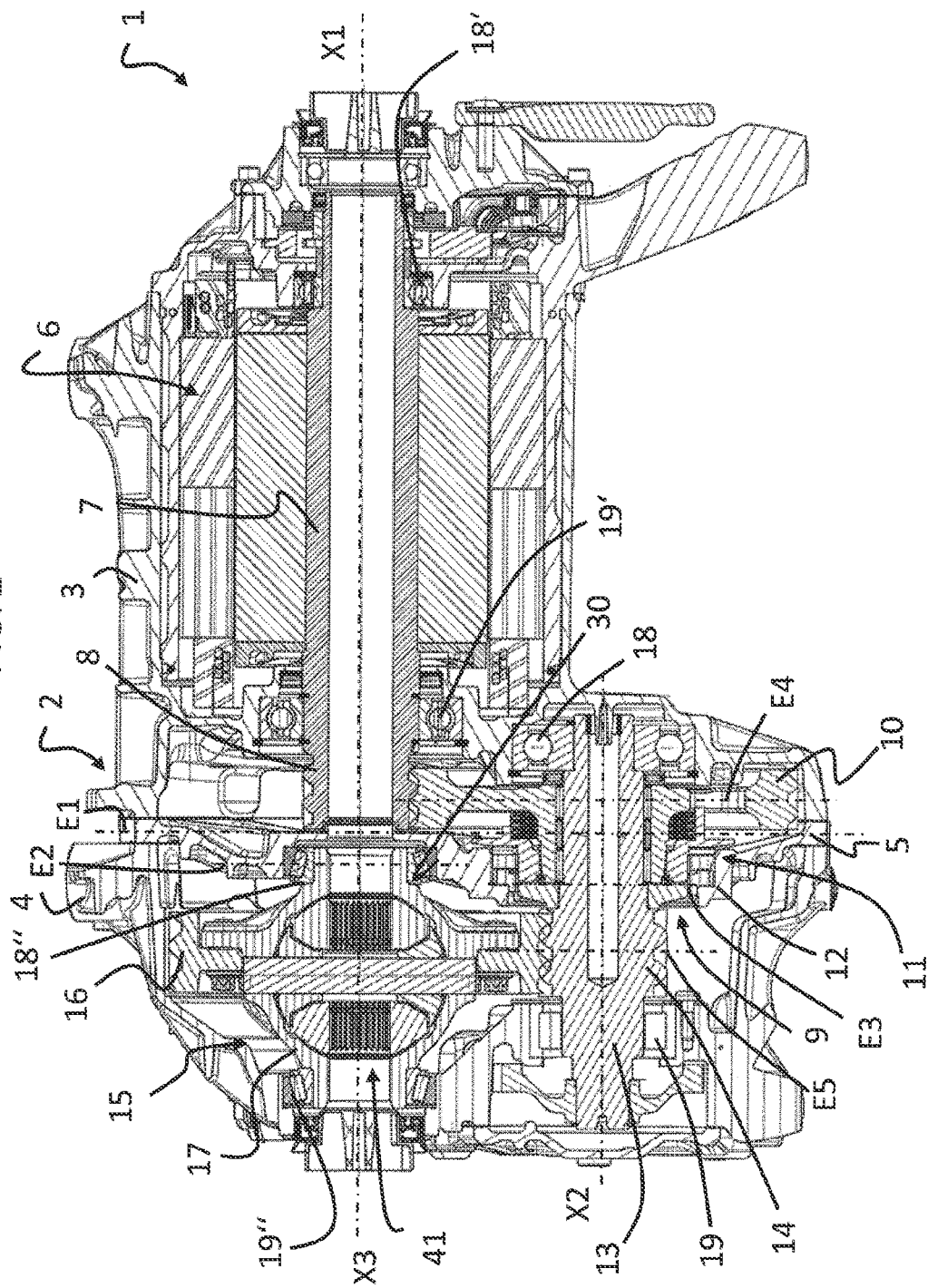
FIG. 2 shows the drive assembly of FIG. 1 in a longitudinal section along the course of section II-II.
Figure 3:
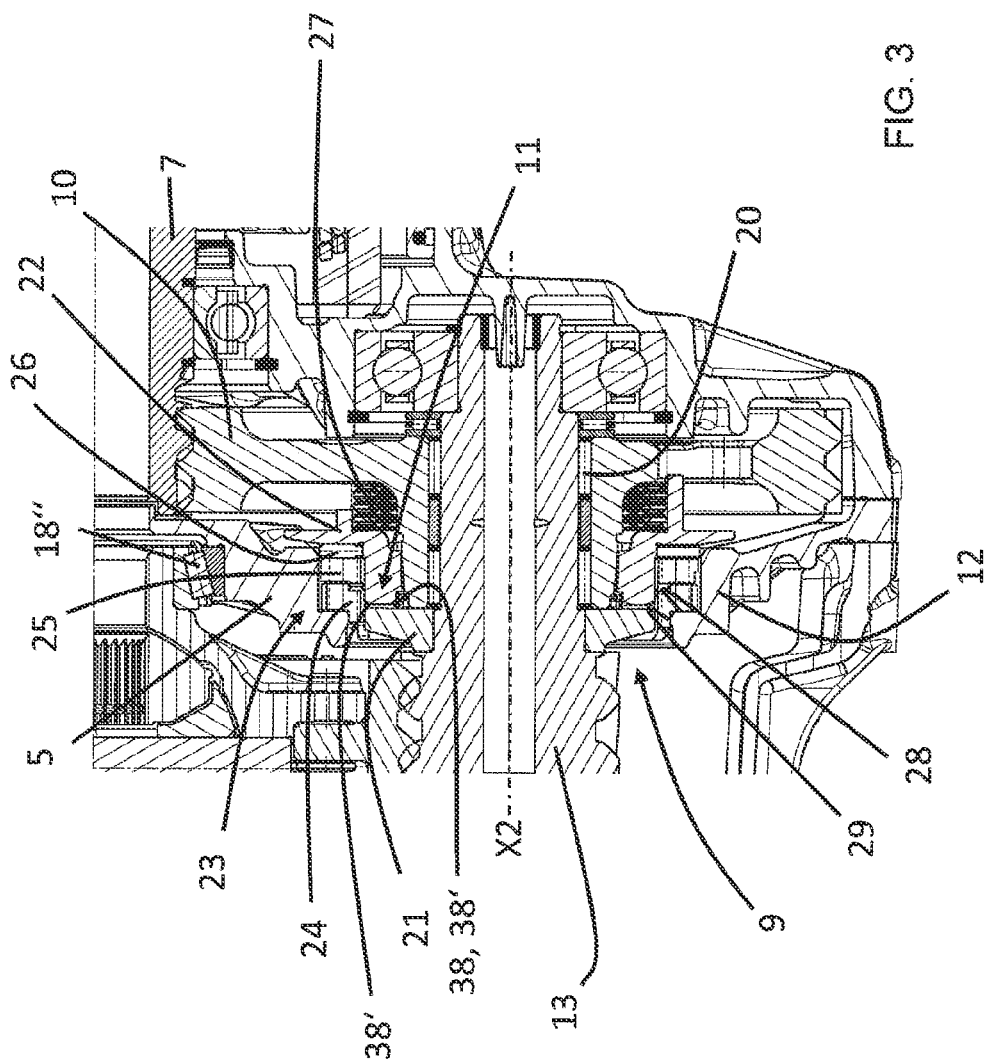
FIG. 3 shows an enlarged view of the clutch arrangement of FIG. 2 with the adjacent components.
Figure 4B:
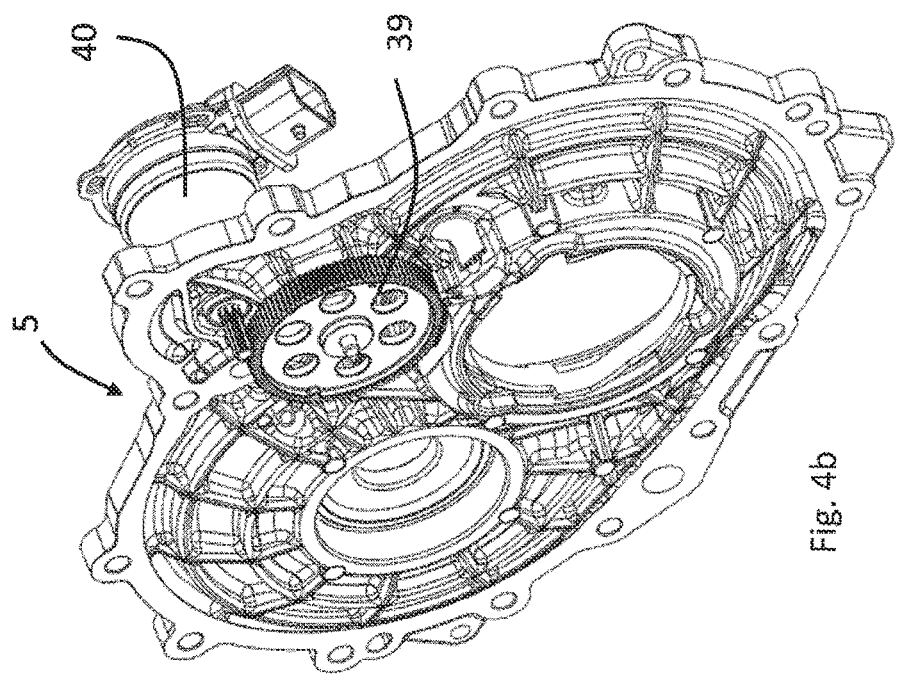
FIG. 4b shows the intermediate plate of FIG. 4a together with the intermediate gear and the actuator drive of the actuator.
Figure 4A:
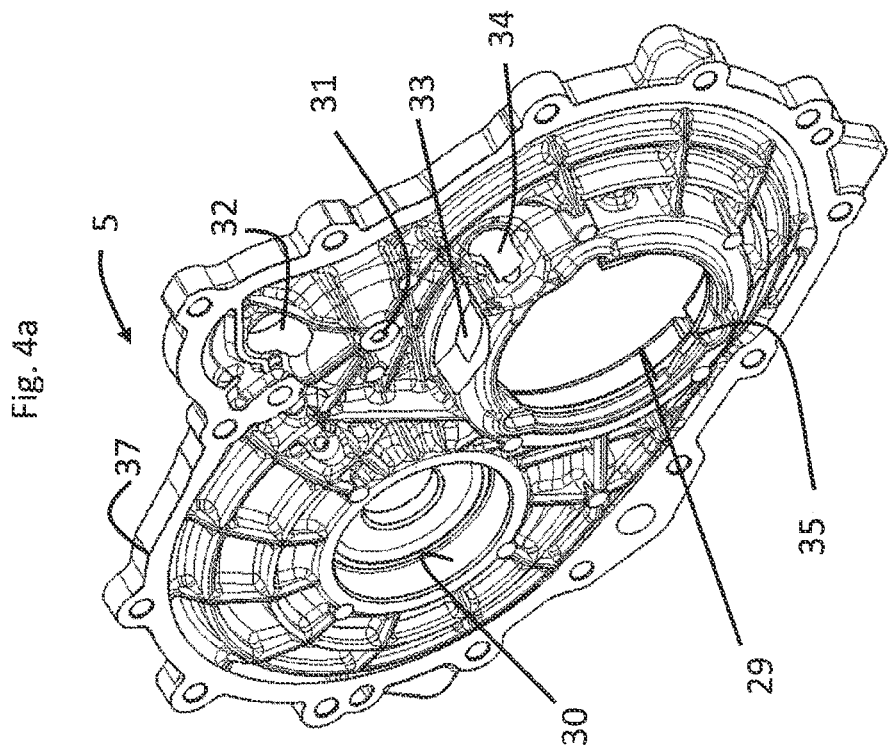
FIG. 4a shows the intermediate plate of the actuator assembly of FIG. 1 in a first perspective view.

FIGS. 1 to 5, which are described together below, show a drive assembly 1 for electromotively driving a vehicle. An electric machine 6 is accommodated in a first housing element 3 of a housing arrangement 2 and comprises a motor shaft 7 which is rotatably drivable about an axis of rotation X1. The motor shaft 7 comprises a drive pinion 8 at one end of the shaft which, together with a toothed drive gear 10, forms a first gear stage.

The drive gear 10 is rotatably mounted on an intermediate shaft 13 by means of a bearing 20, for example a needle bearing, and can be selectively connected to the intermediate shaft for transmitting torque or disconnected therefrom by a clutch arrangement 11. The intermediate shaft 13 also includes a drive pinion 14, which is integrated in the shaft body of the intermediate shaft 13 and, together with a ring gear 16, forms a second gear stage. The ring gear 16 is firmly connected to a differential housing 17 of a differential arrangement 15. The differential arrangement 15 also includes a differential gear set 41, which is arranged inside the differential housing 17 and to which output shafts not shown can be connected.

The transmission arrangement made of drive pinion 8, drive gear 10, clutch arrangement 11, intermediate shaft 13, ring gear 16 and differential arrangement 15 is arranged in a housing space formed by the first housing element 3, the intermediate plate 5 and the second housing element 4. In this case, the first gear stage (8, 10) and the second gear stage (14, 16) are arranged on different sides of the intermediate plate 5.

The intermediate shaft 13 is supported about the axis of rotation X2 by a first bearing 18 which is accommodated in the first housing element 3, and by a second bearing 19 which is accommodated in the second housing element 4. The axis of rotation X2 is arranged parallel offset to the axis of rotation X1 of the motor shaft 7 by the amount of the axis distance of the first gear stage. The intermediate shaft 13 extends through an opening 9 of the intermediate plate 5.

The differential assembly 15 is supported about an axis of rotation X3 with a first bearing 18" which is accommodated in a bearing seat 30 of the intermediate plate 5, and a second bearing 19" which is accommodated in the second housing element 4. The axis of rotation X3 is arranged coaxially to the axis of rotation X1 of the motor shaft 7.

The housing space in which the transmission arrangement is accommodated is divided by the intermediate plate 5 into two partial sections which are connected to each other via the opening 9 in the area of the clutch arrangement 11, wherein the first transmission stage (8, 10) is arranged in the first partial section and the second transmission stage (14, 16) in the second partial section. It is also possible that a sealing element is arranged in the opening 9 of the intermediate plate 5 so that the two partial sections are separated from each other. Thus, a separate oil bath could be provided in each of the two partial sections, the level and/or oil type of which being adapted to the respective gear stage.

The clutch arrangement 11 comprises a clutch device 42 with an axially fixed clutch element 21 and an axially movable clutch element 22. The axially fixed clutch element 21 is axially supported on a shoulder of the intermediate shaft 13 and is connected in a rotationally fixed manner to the intermediate shaft 13 via an interference fit, without being restricted thereto. The axially fixed clutch element 21 has circumferentially distributed axially extending clutch teeth 38', which are designed complementary to clutch teeth 38' of the axially movable clutch element 22, so that the fixed clutch element 21 and the axially movable clutch element 22 together form a dog clutch. The movable clutch element 22 is arranged in a rotationally fixed and axially displaceable manner on a cylindrical portion of the drive gear 10. By moving the movable clutch element 22 in the axial direction, the clutch teeth 38, 38' of the movable clutch element 22 and the fixed clutch element 21 can be selectively engaged with each other so that the rotational degree of freedom of the drive gear 10 around the axis of rotation X2 is bound and a torque can be transmitted from the drive gear 10 to the intermediate shaft 13, or disengaged so that the rotational degree of freedom of the drive gear 10 around the axis of rotation X2 is released and no torque can be transmitted from the drive gear 10 to the intermediate shaft 13.

The axial movement of the movable clutch element 22 is effected by an actuating device 23, which has a drive 40 and a transmission unit 43 with a ramp mechanism. It can be seen that the actuating device 23 is arranged coaxially to the clutch 42, radially around the two clutch elements 21, 22. The transmission unit 43 in the present embodiment comprises a support element in the form of a support ring 24, which is axially supported on the intermediate plate 5, and an actuator element in the form of an setting ring 25, which is axially movable. The support ring 24 and/or the setting ring 25 have a corresponding cam contour in the circumferential direction, which translates a relative rotational movement between the support ring 24 and the setting ring 25 into a translational movement of the setting ring 25. In this respect the rings can also be called cam rings. Furthermore, an axial bearing 26 is provided by which the setting ring 25 is axially supported against the movable clutch element 22. The axially movable clutch element 22 comprises a sleeve portion on which the setting ring 25 and the axial bearing 26 are arranged, and a flange portion against which the axial bearing 26 is axially supported. In this embodiment, the support ring 24 is seated in a clutch receptacle 12 formed by the opening 9 of the intermediate plate 5 and is axially supported against an axial support face 28 of the intermediate plate 5. The support ring 24 is axially overlapping with the first and second clutch elements 21, 22, so that the arrangement is space-saving. The support ring 24 is furthermore, by means of a circumferential face, radially positioned on a radial support face 29 of the clutch receptacle 12. It is also possible that the radial positioning of the support ring 24 is achieved by means of a bearing on one of the elements of the clutch arrangement 11, the intermediate shaft 13 or the drive gear 13.

The support ring 24 can be rotated by an intermediate gear 39, which is supported in a bearing portion 31 in the intermediate plate 5 and is drivingly connected to the support ring 24 through an opening 33 in the clutch receptacle 12. The intermediate gear 39 is in turn connected to an actuator motor 40, which is mounted in a bearing 32 in the intermediate plate 5. Any other configuration of the transmission unit 43 is also possible, which enables a linear drive, for example a spindle drive or a lifting magnet.

Starting from a closed position, in which the axially movable clutch element 22 and the stationary clutch element 21 are connected to each other in a rotationally fixed manner for torque transmission via the respective associated clutch teeth 38, 38', the contact areas between the support ring 24 and the setting ring 25 move away from the axial support face 28 of the clutch receptacle 12 by rotating the support ring 24, so that the setting ring 25 is correspondingly also moved away from the axial support face 28. The setting ring 25, which can also be referred to as intermediate ring, is guided in a non-rotatable and axially movable manner in an accommodation space of the intermediate plate 5. For a rotationally fixed mounting, the intermediate plate 5 has several circumferentially distributed recesses 36, in which the setting ring 25 engages with corresponding radial projections. An axial bearing 26 is arranged between the setting ring 25, which is rotationally fixedly arranged in the space, and the movable clutch part 22, which rotates at the respective speed of the drive gear 10, to compensate for the difference in speed. The movement of the setting ring 25 is transmitted via the axial bearing 26 to the movable clutch part 22 so that the clutch teeth 38, 38' of the movable clutch element 22 and the fixed clutch element 21 are disengaged, and in an open position the movable clutch element 22 and the fixed clutch element 21 can rotate freely against each other.

Starting from the open position, the contact areas and/or support areas of the two rings 24, 25 can be moved in the direction of the axial support face 28 of the clutch receptacle 12 by rotating the support ring 24 in the opposite direction of rotation or, depending on the design of the ramp mechanism, in the same direction of rotation. By means of a return spring 27, the movable clutch element 22 is in this case displaced in the direction of the axial support face 28, until the clutch teeth 38, 38' of the movable clutch element 22 and the fixed clutch element 21 again engage with each other in the closed position.

The rotational movement of the support ring 24 is respectively limited by an end stop 35 in the intermediate plate 5 in both directions of rotation and can be detected by a position sensor not shown, which is accommodated in a bearing section 34 of the intermediate plate 5.

The clutch device 42 is arranged entirely between a center plane E4 of the first gear stage and a center plane E5 of the second gear stage. The clutch device 42 is at least partially axially overlapping with the first bearing 18" of the differential arrangement 15, so that the axial installation space required by the first bearing 18" of the differential arrangement 15 is also used by the clutch device 42.

The intermediate plate 5 has a circumferential flange portion 37 via which the first housing element 3 and the second housing element 4 of the drive assembly 2 are connected to each other. A center plane E2 of the bearing seat 30 of the first bearing 18" of the differential arrangement 15 is located between the center plane E1 of the flange portion 37 and the center plane E3 of the clutch receptacle 12. The center plane E2 is axially overlapping at least part of the clutch arrangement 11 and/or part of the actuation device 23. The intermediate plate 5 thus has a substantially convex/concave shape, which leads to a stiffening of the intermediate plate 5. This stiffening can be further increased by a plurality of ribs. In addition, the intermediate plate has a cranked shape because the center plane E3 of the clutch receptacle 12 is located on the differential side of the center plane E2 of the bearing seat 30. Thereby, the clutch receptacle 12 is positioned outside the axial installation space occupied by the first bearing 18" of the differential arrangement 15, and space is generated for the arrangement of the clutch device 42.

LIST OF REFERENCE SIGNS 1 electric drive assembly
2 housing arrangement
3 housing element
4 housing element
5 intermediate plate
6 electric machine
7 motor shaft
8 drive pinion
9 opening
10 drive gear
11 clutch arrangement
12 clutch receptacle
13 intermediate shaft
14 drive pinion
15 differential arrangement
16 ring gear
17 differential housing
18, 18', 18" bearing
19, 19', 19" bearing
20 needle bearing
21 fixed clutch element
22 movable clutch element
23 actuating device
24 support ring
25 setting ring
26 axial bearing
27 spring element
28 axial bearing face
29 radial bearing face
30 bearing seat
31 bearing region of intermediate gear
32 bearing region of actuator motor
33 opening for actuator gear
34 bearing region for position sensor
35 end stop support ring
36 recess for rotation locking
37 flange portion
38, 38' clutch teeth
39 intermediate gear
40 actuator motor
41 differential gear set
42 clutch device
43 transmission unit
E center plane
X axis of rotation

The invention claimed is:

1. An electric drive assembly for driving a motor vehicle, comprising:
a housing arrangement with a first housing element and a second housing element between which an intermediate plate is arranged;
a drive unit accommodated in the first housing element, comprising a drive shaft which is rotatably drivable about a first axis of rotation;
a transmission arrangement with an intermediate shaft which extends through an opening in the intermediate plate and is rotatably drivable by the drive shaft about a second axis of rotation parallel to the first axis of rotation, and with a power split unit which is drivingly connected to the intermediate shaft and is rotatably supported by a first bearing in a bearing seat of the intermediate plate and a second bearing in the second housing element about a third axis of rotation coaxial to the first axis of rotation; and
a controllable clutch arrangement with a clutch device which is configured to selectively establish or interrupt a torque transmission between the drive unit and the power split unit, and with an actuating device for actuating the clutch device;
wherein the clutch device is arranged coaxially to the intermediate shaft, and the opening of the intermediate plate has a clutch receptacle on which at least one element of the clutch arrangement is axially supported.

2. The drive assembly according to claim 1,
wherein the intermediate shaft is drivingly connected to the drive shaft via a first gear stage, and to the power split unit via a second gear stage, and
the clutch device is arranged between the intermediate shaft and one of the first gear stage and the second gear stage, in the power path between the drive unit and the power split unit.

3. The drive assembly according to claim 2,
wherein the clutch device is arranged axially completely between a center plane of the first gear stage and a center plane of the second gear stage.

4. The drive assembly according to claim 2,
wherein the clutch device comprises a first clutch element which is connected in a rotationally fixed manner to the intermediate shaft, and
a second clutch element, which is connected in a rotationally fixed manner to an element of the first gear stage or the second gear stage that is rotatably supported on the intermediate shaft,
wherein at least one of the first clutch element and the second clutch element is reversibly movable in the axial direction into an open position, in which the first clutch element and the second clutch element can rotate freely relative to each other about the second axis of rotation, and into a closed position, in which the first clutch element and the second clutch element are connected to each other for torque transmission.

5. The drive assembly according to claim 1,
wherein the actuating device comprises a controllable drive and a transmission unit for transmitting a force generated by the drive to the clutch device.

6. The drive assembly according to claim 5,
wherein the transmission unit comprises a support element, which is axially supported on the clutch receptacle of the intermediate plate, and
a setting element axially movable relative thereto, which is axially supported against one of the first clutch element and the second clutch element.

7. The drive assembly according to claim 6,
wherein one of the first clutch element and the second clutch element is loaded by a return spring, and
is movable by the setting element against a restoring force of the return spring.

8. The drive assembly according to claim 1,
wherein the clutch device is configured as a dog clutch.

9. The drive assembly according to claim 1,
wherein the clutch device is configured as a friction clutch.

10. The drive assembly according to claim 1,
wherein the intermediate plate has a circumferential flange portion via which the first housing element and the second housing element are connected to each other,
wherein a center plane of the flange portion is axially spaced from at least one of a center plane of the bearing seat and a center plane of the clutch receptacle.

11. The drive assembly according to claim 10,
wherein the center plane of the bearing seat is arranged offset relative to the center plane of the flange portion in a direction towards the power split unit.

12. The drive assembly according to claim 10,
wherein the center plane of the bearing seat is arranged between the center plane of the flange portion and the center plane of the clutch receptacle, or
wherein the center plane of the clutch receptacle is arranged between the center plane of the flange portion and the center plane of the bearing seat.

13. The drive assembly according to claim 10,
wherein at least one of the center plane of the bearing seat and the center plane of the flange portion is arranged with an axial overlap with at least one element of the clutch arrangement.

14. The drive assembly according to claim 1,
wherein a sealing element is arranged in the opening of the intermediate plate.

15. The drive assembly according to claim 1,
wherein the clutch device is arranged radially inside the actuating device.

* * * * *